(12) United States Patent
Shimada (10) Patent No.: US 8,957,311 B2
(45) Date of Patent: Feb. 17, 2015

(54) WIRE HARNESS AND WIRE FITTING

(71) Applicant: Sumitomo Wiring Systems, Ltd., Yokkaichi-city, Mie (JP)

(72) Inventor: Tatsuya Shimada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 207 days.

(21) Appl. No.: 13/673,426

(22) Filed: Nov. 9, 2012

(65) Prior Publication Data

US 2013/0146353 A1 Jun. 13, 2013

(30) Foreign Application Priority Data

Dec. 9, 2011 (JP) ................................ 2011-270094

(51) Int. Cl.
*H02G 3/04* (2006.01)
*B60R 16/02* (2006.01)

(52) U.S. Cl.
CPC .......... *H02G 3/0406* (2013.01); *B60R 16/0215* (2013.01)
USPC .......... 174/72 A; 174/536; 174/559; 174/529; 174/520; 174/169; 361/386

(58) Field of Classification Search
CPC ............ H01B 17/02; H01B 7/00; H02G 7/05; H02G 3/045; H02G 7/08; H02G 7/04; H02G 3/0406; H02G 3/04; H02G 1/00; H02G 1/06; H02G 3/0418; F16L 3/137; B60R 16/02; B60R 16/0207; B60R 16/0215; H05K 7/00; H01R 13/5829; H01R 13/5825

USPC ................................................. 174/72 A, 169
See application file for complete search history.

(56) References Cited

U.S. PATENT DOCUMENTS

| | | | |
|---|---|---|---|
| 6,854,693 B2 * | 2/2005 | Harrison et al. | 248/68.1 |
| 7,030,322 B2 * | 4/2006 | Preissl et al. | 174/138 R |
| 7,661,633 B2 * | 2/2010 | Igarashi et al. | 248/74.3 |
| 7,866,612 B2 * | 1/2011 | Doi et al. | 248/71 |
| 2001/0010624 A1 * | 8/2001 | Katsui | 361/709 |
| 2009/0121091 A1 * | 5/2009 | Elm et al. | 248/57 |
| 2010/0027232 A1 | 2/2010 | Kasuya et al. | |

FOREIGN PATENT DOCUMENTS

| | | |
|---|---|---|
| JP | A-2010-018106 | 1/2010 |
| JP | A-2010-027242 | 2/2010 |

* cited by examiner

*Primary Examiner* — Timothy Thompson
*Assistant Examiner* — Michael F McAllister
(74) *Attorney, Agent, or Firm* — Oliff PLC (57) ABSTRACT

A wire harness including a wire fitting that holds a wire in a predetermined shape is provided. A wire fitting includes a base molded to an uneven plate-shape and a cover covering a wiring space of the base. In the base, an outer frame portion formed projecting around the wiring space on a wiring portion forming a bottom plate includes an inner edge step portion, an intermediate plate portion, and an outer edge step portion. In the intermediate plate portion, which projects outward, a plurality of through holes for wire fastening are formed linearly along the perimeter of the wiring space, the number of the through holes for wire fastening being at least the number of wire fasteners attached to that portion of a wire that extends from the wiring portion to the outside thereof.

12 Claims, 5 Drawing Sheets

WIRE HARNESS AND WIRE FITTING

BACKGROUND

The exemplary embodiments relate to a wire fitting that holds wires in a predetermined shape as well as a wire harness including the same.

Wire harnesses that are mounted to vehicles, such as automobiles or the like, often include a wire fitting made of resin to which wires are attached, and are laid out in a state in which the wires are held along a predetermined path by the wire fitting. For example, in an ordinary conventional wire harness, the wires are fastened to a plate-shaped or rod-shaped resin member by binder members such as adhesive tape or belt members. Thus, the wires are held in their predetermined shape.

Moreover, the wire harness disclosed in JP 2010-27242A includes a wire fitting made of two plate-shaped resin members that are fixed to each other by heat-pressing in a state in which they sandwich a wire bundle. One of the resin members is a base made of a flat plate-shaped base portion and ribs standing upright on the base portion. The other resin member is a flat plate-shaped cover, in which through holes are formed into which the ribs of the base are inserted, and which is fixed to the base portion of the base in a state in which it covers the base.

In the wire harness disclosed in JP 2010-27242A, the wires are sandwiched between the base and the cover. Moreover, in the wire fitting disclosed in JP 2010-27242A, the wires are arranged between a plurality of ribs protruding from a flat portion of the base. The ribs on the base are formed on both sides of the wire paths, and function as guides for the wires.

Now, what is particularly important concerning the shape of wire harnesses is that the wires extend to a predetermined length from a predetermined position that is close to the connection counterpart. Here, the connection counterpart may be an electrical component or a connector or the like that is provided at the end of other wires.

For example, in a wire harness that is arranged below a seat of an automobile, it is important that an intermediate portion of the wires is fastened to a predetermined position leaving a predetermined length to the connector at the end or to the end of the wires, so that a connector at the end of the wires reaches the component, such as a motor for driving the seat, or the connector provided at the end of the other wires at just the right length.

On the other hand, it may be sufficient if, in the wire harness, the path of the wires up to the fastening position is accommodated within a given region with a relative wide range of tolerance. For example, in a wire harness arranged below the seat of an automobile, as long as the portion of the wires up to the fastening position is accommodated within a space between the seat and the component, such as the motor for driving the seat, then a layout over any path is allowable.

In order to employ the wire fitting of JP 2010-27242A, wires having elasticity tend to be lifted up from the flat portion of the base and cross over the ribs of the base. In the wire fitting of JP 2010-27242A, when wires lifted up from the surface of the base cross over the ribs, then the cover cannot be properly put over the base.

Consequently, if the wire fitting of JP 2010-27242A is employed, a bothersome operation of laying out the wires while pushing the wires onto the base so that the wires do not cross over the ribs becomes necessary. That is to say, the wire fitting of JP 2010-27242A poses the problem of requiring a bothersome wire layout operation.

Moreover, if the wire fitting of JP 2010-27242A is employed, it is necessary to prepare many types of wire fittings, in accordance with the required specifications for the fastening positions of the plurality of wires constituting the wire harness. For this reason, the wire fitting of JP 2010-27242A poses the problem of poor adaptability to a variety of required specifications.

Moreover, an ordinary conventional wire harness requires large tools, such as drawing boards, that depend on the required specifications, a large number of resin members such as corrugated tubes, a large number of binder members for fastening the wires to the resin members, and a bothersome operation of attaching many components to the wires.

As explained above, conventional wire fittings and wire harnesses pose the problem that they require a large number of components, a bothersome operation for handling these, and extensive tools, in order to protect the wires while holding them in shapes in accordance with a variety of required specifications.

SUMMARY

To address the above and other problems, a novel wire harness may have a wire fitting that holds wires in a predetermined shape, with which the number of man-hours for laying out the wires on the wire fitting can be reduced, and moreover, which can be adapted flexibly to a variety of required specifications.

A wire harness according to a first exemplary embodiment may include a wire; a wire fitting including an uneven plate-shaped base defining a wiring space accommodating a part of the wire, and a plate-shaped cover that is assembled to the base and covers the wiring space; and one or more wire fasteners attached to the wire and fastened to a portion of the wire fitting where through holes for wire fastening are disposed. In the wire harness according to the first embodiment, the base of the wire fitting includes a bottom plate portion and an outer frame portion. The bottom plate portion faces the wiring space. The outer frame portion projects around the wiring space. The outer frame portion includes an inner edge step portion, an intermediate plate portion and an outer edge step portion. The inner edge step portion rises from the bottom plate portion along an outer edge of the bottom plate portion. The intermediate plate portion projects outward from the inner edge step portion. A plurality of the through holes for wire fastening is disposed linearly along the intermediate plate portion, the number of the through holes for wire fastening being at least the number of the wire fasteners attached to a portion of the wire that extends from the bottom plate portion to the outside thereof. The outer edge step portion extends along an outer edge of the intermediate plate portion.

A wire harness according to a second exemplary embodiment is an embodiment of the wire harness according to the first embodiment. In the base of the wire fitting of the wire harness according to the second embodiment, the plurality of through holes for wire fastening is disposed linearly along the outer frame portion around the entire perimeter of the bottom plate portion.

A wire harness according to a third exemplary embodiment is an embodiment of the wire harness according to the first embodiment. In the wire harness according to the third embodiment, a plurality of groove-shaped portions defining pathways for the wire are disposed in the inner edge step portion of the outer frame portion of the base of the wire fitting, the pathways each extending from the bottom plate portion to a respective one of the through holes for wire fastening.

A wire harness according to a fourth exemplary embodiment is an embodiment of the wire harness according to the first embodiment. In the wire harness according to the fourth embodiment, the wire fastener includes a connector attached to an end of the wire and a holding device. The holding device protrudes from the connector, the holding device being fastened to that portion of the outer frame portion of the base where the through holes for wire fastening are disposed.

A wire harness according to a fifth exemplary embodiment is an embodiment of the wire harness according to the first embodiment. In the wire harness according to the fifth embodiment, the wire fastener includes a belt wound around the wire, a belt holding portion holding the best in ring shape, and a holding device. The holding device protrudes from the belt holding portion, the holding device being fastened to that portion of the outer frame portion of the base where the through holes for wire fastening are disposed.

A wire harness according to a sixth exemplary embodiment is an embodiment of the wire harness according to the first embodiment. In the wire harness according to the sixth embodiment, the base and the cover of the wire fitting are members being formed by vacuum-molding flat plate-shaped resin members.

According to a seventh exemplary embodiment, a wire fitting may include an uneven plate-shaped base defining a wiring space accommodating a part of a wire and a plate-shaped cover that is assembled to the base and covers the wiring space. The base includes a bottom plate portion facing the wiring space and an outer frame portion projecting around the wiring space. The outer frame portion includes an inner edge step portion rising from the bottom plate portion along an outer edge of the bottom plate portion, an intermediate plate portion projecting outward from the inner edge step portion, a plurality of through holes for wire fastening disposed linearly along the intermediate plate portion, such that a portion of a wire fastener can be inserted through the through holes for wire fastening, and an outer edge step portion extending along an outer edge of the intermediate plate portion.

In accordance with the exemplary embodiments, a wire is tucked between the base and the cover constituting the wire fitting, and is fastened to a predetermined position on the outer frame portion of the base by a wire fastener that is fastened to a portion of the wire fitting where through holes for wire fastening are formed.

Consequently, in the wire to which the wire fitting according to the exemplary embodiments is attached, the portion fastened by the wire fastener is held at a constant position, and furthermore, the length of the portion at the end from the portion fastened by the wire fastener is held at a constant length. That is to say, the shape of the wire is held by the wire fitting such that the end of the wire reaches its connection counterpart at just the right length. Moreover, the wire is protected by the base and the cover.

Moreover, in the wire harness according to the exemplary embodiments, the portion of the wire that is laid out on the bottom plate portion of the base, that is, the portion up to the outer frame portion of the base, is accommodated within a large wiring space between the cover and the bottom plate portion of the base.

Consequently, in the operation of laying out wires on the bottom plate portion of the base, a layout over any path on the bottom plate portion is allowable, and even if the wires are lifted up from the bottom plate portion, the wires can be accommodated within the wiring space between the cover and the bottom plate portion of the base simply by pushing the cover onto the base. That is to say, a bothersome operation of laying out the wires while pushing the wires lifted up from the bottom plate portion of the base to the bottom plate portion is not necessary.

Moreover, the attachment of the wire fitting to the wires can be completed simply by assembling the cover to the base after fastening the wire fastener attached to the portion of the wires that need to be fastened to the portion of the through holes for wire fastening at the predetermined position in the outer frame portion of the base. Consequently, with the present embodiments, the structure and the operation for holding the wires in a predetermined shape as well as the structure and the operation for covering the portion of the wires to be protected (intermediate portion) can be simplified.

Moreover, in the outer frame portion of the base, the inner edge step portion and the outer edge step portion function as reinforcement portions to increase the rigidity of the overall base, and in particular the rigidity of the outer frame portion. Accordingly, the fastener in the wire harness according to the exemplary embodiments is fastened to the outer frame portion of the base with high rigidity. For this reason, the wire fitting of the wire harness according to the exemplary embodiments has a high performance of holding the wires in a constant shape.

Furthermore, in the wire fitting of the wire harness according to the exemplary embodiments, there are at least the same number of through holes for wire fastening as there are wire fasteners disposed in rows in the outer frame portion of the base. Therefore, the fastening position of the wire fastener constituting the wire harness can be selected from a plurality of positions prepared in advance in accordance with the required specifications. Consequently, the wire fitting of the wire harness according to the exemplary embodiments is superior in its ability to be adapted to a variety of required specifications.

According to the second embodiment, the fastening position of the wire fastener constituting the wire harness can be selected in accordance with the required specifications from a plurality of positions extending around the entire perimeter of the bottom plate portion of the base. Therefore, it is possible to fasten the wires to positions that are extremely close to their connection counterparts, regardless of the direction in which the connection counterparts of the wires are located with respect to the perimeter of the wire fitting. Consequently, with the second embodiment, the freedom to select the wire fixing position is increased even more.

According to the third embodiment, the passage of the wires that are laid out from the bottom plate portion of the base across the portion of the through holes for wire fastening of the outer frame portion can be ensured, and the gap between the base and the cover outside this passage becomes narrow. Therefore, it can be prevented that the wires arranged in the wiring space on the bottom plate portion of the base stick out from the gap between the base and the cover.

In the wire harness according to the fourth embodiment, a connector with a holding device is employed in the case that it is necessary to fasten a connector at the end of the wire to the wire fitting. On the other hand, in the wire harness according to the fifth embodiment, a holding device with a belt is employed in the case that the connector at the end of the wire is arranged outside the wire fitting, and it is necessary to fasten an intermediate portion of the wire to the wire fitting, leaving a predetermined length up to the end of the wire. The wire harness according to the fourth or fifth embodiments can accommodate forms in which a connector at the end of the wires is fastened on the wire fitting and forms in which the connector at the end of the wires is arranged outside of the wire fitting. Thus, the freedom of selecting the form by which the wires are held is high.

Generally, members obtained by vacuum-molding flat plate-shaped members can be manufactured more easily and at lower cost than members that are obtained by injection molding of resin. Consequently, with the sixth embodiment, the manufacturing time and manufacturing costs for the wire fitting can be reduced. It should be noted that the flat plate-shaped base including the ribs disclosed in JP 2010-27242A cannot be obtained by vacuum-molding a flat plate-shaped member.

DETAILED DESCRIPTION

The following is a description of embodiments of the invention, with reference to the accompanying drawings. The following embodiments are merely examples for working the invention, and are not meant to limit the technical scope of the invention.

General Configuration

First, the configuration of a wire fitting 10 in accordance with an embodiment of the present invention and a wire harness 100 in accordance with an embodiment of the present invention is explained with reference to FIGS. 1 to 3.

The wire harness 100 includes a bundle of wires made up of a plurality of electric wires 9, wire fasteners, which are attached to this bundle of electric wires, and the wire fitting 10. The wire harness 100 is attached, for example, in a space below the seats in a vehicle, a space behind the ceiling or in a trunk room or the like, and is connected to other wires or electric devices around it. For this reason, the wires 9 of the wire harness 100 are wires with a connector that include an insulated wire and a connector 91 that is attached to an end of this insulated wire.

In the wire harness 100, the plurality of wires 9 are bundled together by the wire fitting 10 in a state in which they are held in a predetermined shape. For this reason, the wire harness 100 can be easily attached to a through hole portion of a supporting body using a holding device.

Figure 1:
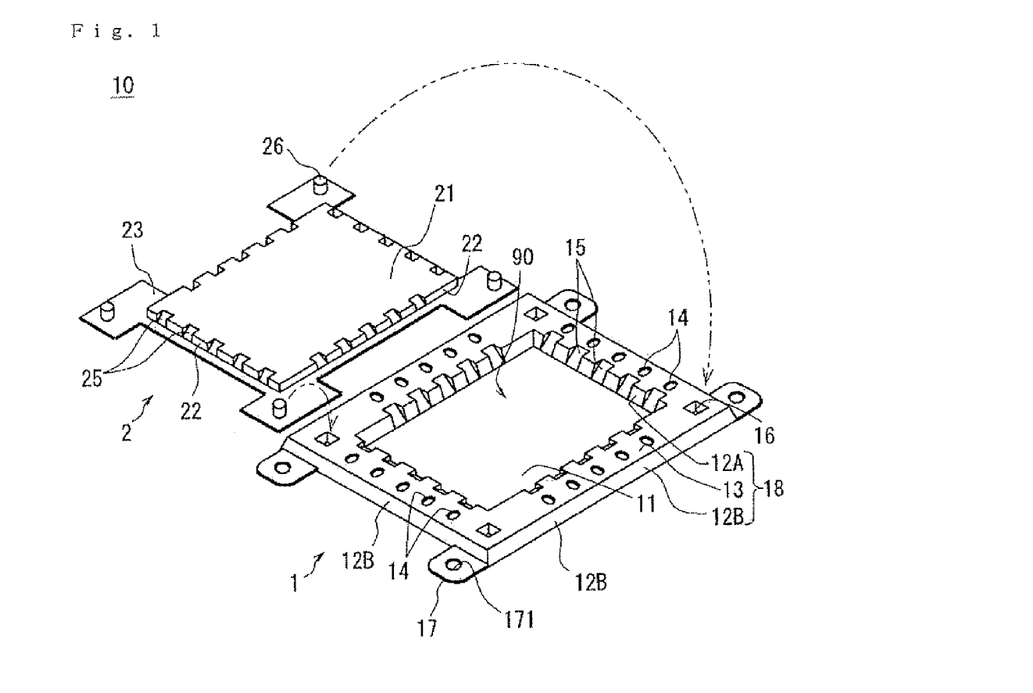
FIG. 1 is a perspective view of a wire fitting 10 according to an embodiment of the invention.
Figure 2:
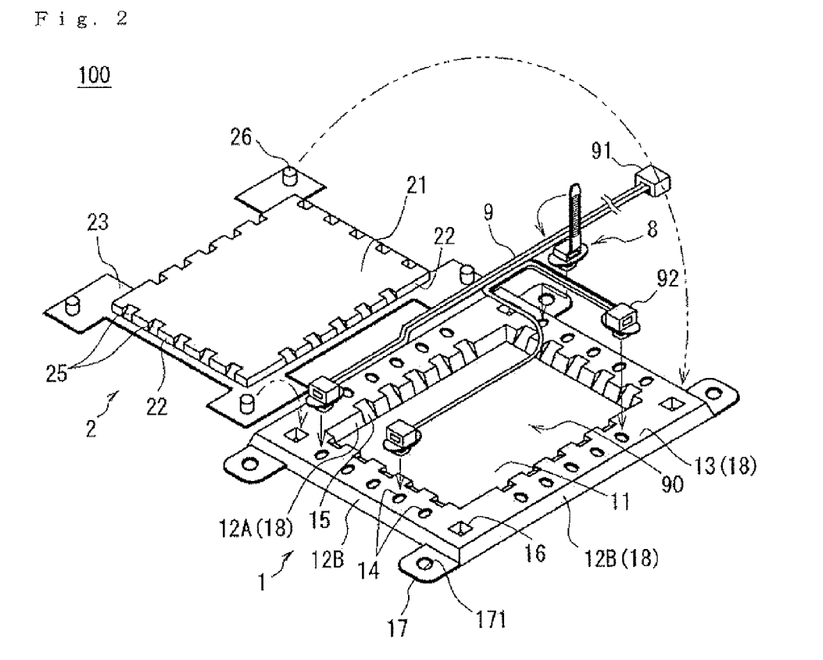
FIG. 2 is an unfolded perspective view of a wire harness 100 according to an embodiment of the invention.
Figure 3:
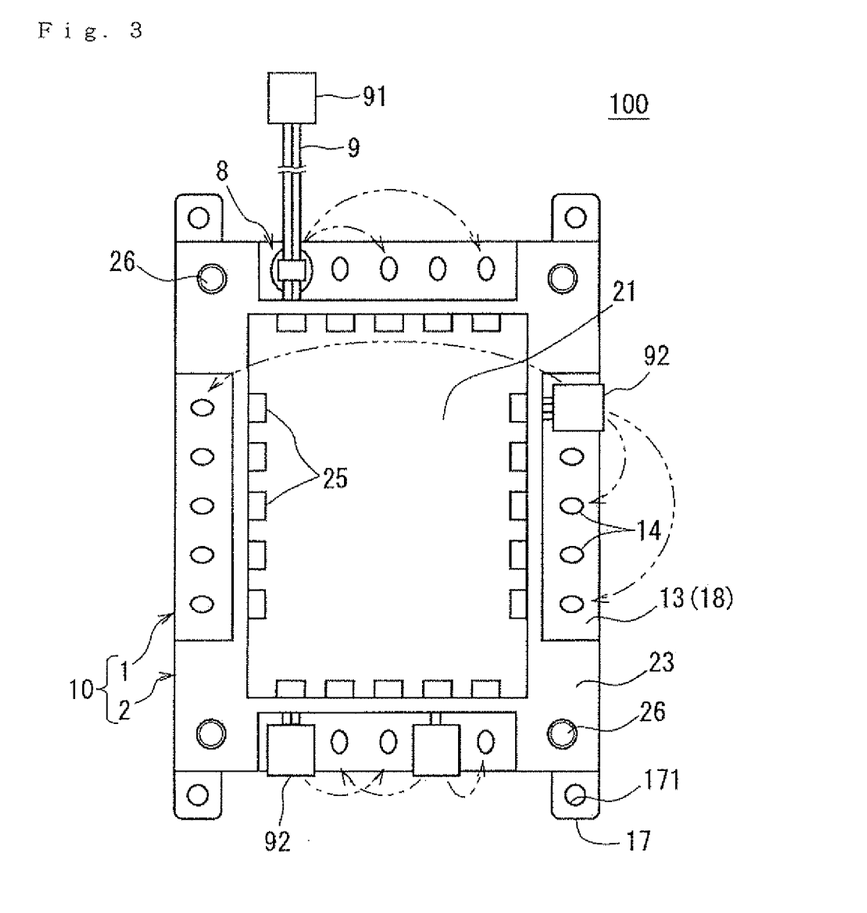
FIG. 3 is a top view of the wire harness 100.

As shown in FIGS. 1 to 3, the wire fitting 10 is constituted by a base 1 and a cover 2 that is laid over the base. The cover 2 is assembled to the base 1 after tucking a mid-portion of the plurality of wires 9 between the base 1 and the cover 2.

The base 1 and the cover 2 are fixed to each other in a state in which the wires 9 are tucked in between them, and thus, the wire fitting 10 holds the wires 9 tucked between the base 1 and the cover 2 in their predetermined shape.

In the present embodiment, the wire fitting 10 is a member that can be obtained by vacuum molding a plate-shaped resin member. The wire fitting 10 may be a resin member made of, for example, polypropylene (PP), polyethylene (PE), polyvinylchloride (PVC), polyethylene-terephthalate (PET), polyamide (PA) or the like.

Moreover, if the base 1 and the cover 2 are obtained by vacuum molding, then, depending on the application, polyvinylchloride (PVC), which has superior fire retardancy, polypropylene (PP), which has superior stretchability, or polyethylene-terephthalate (PET), which has superior rigidity, are preferable as the resin material constituting the base 1 and the cover 2. These resin materials are all materials that can be obtained easily and at low cost.

Base

The base 1 constituting the wire fitting 10 is made by molding a resin member into an uneven plate-shape. As noted above, the base 1 in the present embodiment is obtained by vacuum-molding a flat plate-shaped resin member. As shown in FIG. 1, the base 1 includes a wiring portion 11, a first outer frame portion 18, and fastening ear portions 17.

The wiring portion 11 constituting the base 1 is a plate-shaped member facing a wiring space 90 in which the wires 9 are arranged, and can be regarded as a bottom plate portion forming a bottom face of the base 1.

The wiring portion 11 shown in FIGS. 1 and 2 is flat plate-shaped, but may also be plate-shaped with a plurality of reinforcement protrusions or recesses. In this case, the base 1 has an uneven plate shape, so that in the base 1, the reinforcement protrusions on the side of the wiring space 90 are recesses on the side opposite to that of the wiring space 90. Moreover, in the base 1, the reinforcement recesses on the side of the wiring space 90 are protrusions on the side opposite to that of the wiring space 90. However, the reinforcement protrusions are formed with a height that is lower than the height of a first step portion 12A on an inner edge side, which is explained later.

The first outer frame portion 18 constituting the base 1 is a portion that is formed to be projecting around the wiring space 90 above the wiring portion 11, and forms an outer frame of the base 1. As shown in FIGS. 1 and 2, the first outer frame portion 18 includes the first step portion 12A on the inner edge side, an intermediate plate portion 13 and a first step portion 12B on an outer edge side.

The first step portion 12A on the inner edge side of the first outer frame portion 18 is a step portion at the inner edge that rises from the wiring portion 11 along the outer edge of the wiring portion 11, which forms the bottom plate. Moreover, the intermediate plate portion 13 of the first outer frame portion 18 is a plate-shaped portion that protrudes to the outer side from the first step portion 12A on the inner edge side. In the intermediate plate portion 13, a plurality of through holes 14 for wire fastening are lined up in rows.

The through holes 14 for wire fastening are through holes through which a portion of holding devices 7 can be inserted. Holding devices 7 are parts of wire fasteners 92 and 8, which are explained below. Among the wire fasteners 92 and 8 are a connector-type fastener 92 with a holding device 7 and a belt type fastener 8 with a holding device 7. These are explained in detail further below.

Moreover, the first step portion 12B on the outer edge side of the first outer frame portion 18 is a step portion at the outer edge that is formed along the outer edge of the intermediate plate portion 13. The first outer frame portion 18 rises above the wiring portion 11 for a height that corresponds to the height of the first step portion 12A on the inner edge side and the first step portion 12B on the outer edge side.

The plurality of through holes 14 for wire fastening are preferably formed in rows with spacing therebetween along the first outer frame portion 18 around the entire perimeter of the wiring portion 11. In the present embodiment, the through holes 14 for wire fastening are distributed along the four edges of the rectangular first outer frame portion 18, which encloses the rectangular wiring portion 11 from four sides. That is to say, in this embodiment, the through holes 14 for wire fastening are disposed linearly along the four sides of the perimeter of the wiring portion 11.

It should be noted that if the wiring portion 11 has a polygonal shape other than a rectangle, and the first outer frame portion 18 has a polygonal shape that encloses the polygonal wiring portion 11 from all sides corresponding to its edges, then it is preferable that the through holes 14 for wire fastening are distributed along all edges of the polygonal first outer frame portion 18.

In the example shown in FIG. 1, the first step portion 12A on the inner edge side and the first step portion 12B on the outer edge side are formed with an overall constant height, but it is also possible that the step portions include portions that are higher than other portions.

Instead of being provided with a flat plate shape, the intermediate plate portion 13 constituting the first outer frame portion 18 may be provided with a shape that mixes flat portions with recesses or protrusions. In the example shown in FIG. 1, the intermediate plate portion 13 is provided with a shape that mixes flat portions with recesses.

As shown in FIG. 1, parts of the intermediate plate portion 13 of the first outer frame portion 18 are provided with preliminary fixing recesses 16.

Moreover, the fastening ear portions 17 are plate-shaped portions that protrude further outward from the first outer frame portion 18. The fastening ear portions 17 are provided with through holes 171 for fastening the wire fitting.

Holding devices are passed through the through holes 171 for fastening the wire fitting when the wire fitting 10 is attached to a support, such as a panel of an automobile. By passing the holding devices through the through holes 171 for fastening the wire fitting of the base 1 and attachment holes formed in the support member, the wire fitting 10 can be fastened to the support member.

Moreover, the first step portion 12A on the inner edge side of the first outer frame portion 18 of the base 1 is provided with a plurality of wire grooves 15, which are groove-shaped portions that serve as pathways for the wires 9 that extend from the wiring portion 11 to the plurality of through holes 14 for wire fastening.

Cover

The cover 2 constituting the wire fitting 10 is made by molding a resin member into an uneven plate-shape. By assembling it to the base 1, this cover 2 covers the wiring space 90 on the wiring portion 11 of the base 1. As noted above, like the base 1, the cover 2 in the present embodiment is obtained by vacuum-molding a flat plate-shaped resin member. As shown in FIGS. 1 and 2, the cover 2 includes an opposing wall portion 21, a second step portion 22 and a second outer frame portion 23. Furthermore, the cover 2 also includes a plurality of preliminary fixing protrusions 26 that are formed in parts of the second outer frame portion 23.

In the following explanations, it is assumed that, if explained in relation to the base 1, the position or shape of the constituent elements of the cover 2 is such that the cover 2 is assembled covering the base 1.

The opposing wall portion 21 constituting the cover 2 opposes the wiring portion 11 of the base 1 across the wiring space 90. The opposing wall portion 21 of the present embodiment is provided with an overall flat plate shape. However, like the wiring portion 11 of the base 1, the opposing wall portion 21 may also have a plate shape in which a plurality of reinforcement protrusions or recesses are formed.

The second step portion 22 constituting the cover 2 is formed along the outer edge of the opposing wall portion 21 and is raised from the opposing wall portion 21 to the side opposite to that of the base 1, forming a step. In other words, all of the opposing wall portion 21 and the second step portion 22 in the cover 2 is formed protruding towards the base 1. However, it is also possible that all of the opposing wall portion 21 and the second step portion 22 of the cover 2 is formed protruding to the side opposite to that of the base 1.

The second outer frame portion 23 forming part of the cover 2 is formed along the outer edge of the second step portion 22 and constitutes the outer edge portion of the cover 2. The second outer frame portion 23 may have a flat plate shape, but it is also possible that it has a shape in which recesses or protrusions are mixed with flat portions. In the example shown in FIG. 1, parts of the second outer frame portion 23 are provided with preliminary fixing protrusions 26 that protrude toward the base 1. The preliminary fixing protrusions 26 formed in the cover 2 are explained further below.

Moreover, at positions in the second step portion 22 of the cover 2 that oppose the plurality of wire grooves 15 formed in the first step portion 12A on the inner edge side of the base 1, a plurality of wire grooves 25 are formed, which are groove-shaped portions that, together with the wire grooves 15, serve as pathways for the wires 9 that extend from the wiring portion 11 to the respective plurality of through holes 14 for wire fastening.

Preliminary Fixing Mechanism

Parts of the intermediate plate portion 13 in first outer frame portion 18 of the base 1 are provided with preliminary fixing recesses 16. In the example shown in FIGS. 1 and 2, four preliminary fixing recesses 16 are formed at the four corners of the intermediate plate portion 13 of the first outer frame portion 18. The preliminary fixing recesses 16 form indentations that are open toward the cover 2.

On the other hand, parts of the second outer frame portion 23 in the cover 2 are provided with preliminary fixing protrusions 26 that respectively fit into the preliminary fixing recesses 16 of the base 1. In the example shown in FIGS. 1 and 2, the four preliminary fixing protrusions 26 are respectively formed at positions opposing the four preliminary fixing recesses 16.

In the wire fitting 10, the preliminary fixing recesses 16 formed in parts of the base 1 and the preliminary fixing protrusions 26 formed in parts of the cover 2 constitute a preliminary fixing mechanism for fixing the cover 2 to the base 1.

The outer shape of the side walls of the preliminary fixing protrusions 26 is formed to a shape that is inscribed by the inner walls of the preliminary fixing recesses 16 when slightly compressed. Thus, when the preliminary fixing protrusions 26 are pushed into the preliminary fixing recesses 16, the cover 2 is fixed with respect to the base 1 in a state in which it covers the wiring portion 11 of the base 1, due to the friction resistance between the side walls of the preliminary fixing protrusions 26 and the inner walls of the preliminary fixing recesses 16.

As has been shown above, the preliminary fixing recesses 16 and the preliminary fixing protrusions 26 constitute a preliminary fixing mechanism that fixes the cover 2 to the base 1 in a state in which the cover 2 covers the wiring portion 11, through a structure in which protrusions are fitted into recesses.

In the example shown in FIG. 1, the preliminary fixing recesses 16 are provided on the side of the base 1, and the preliminary fixing protrusions 26 are provided on the side of the cover 2, but the converse configuration is also possible. That is to say, the preliminary fixing recesses 16 may be provided on the side of the cover 2, and the preliminary fixing protrusions 26 may be provided on the side of the base 1. It is also possible to mix the preliminary fixing recesses 16 and the preliminary fixing protrusions 26 in the base 1 and the cover 2.

Wire Harness

As shown in FIGS. 2 and 3, the wire harness 100 comprises a group of wires including a plurality of wires 9, wire fasteners 92 and 8 that are attached to the group of wires, and the wire fitting 10. Among the wire fasteners 92 and 8 are the connector type fastener 92 with the holding device 7 and the belt type fastener 8 with the holding device 7.

In the wire harness 100, the mid portions of the plurality of wires 9 are arranged in the wiring space 90 above the wiring portion 11 of the base 1. Moreover, a connector 91 at one end of some of the wires 9 is arranged outside of the base 1.

The wires 9 at which the connector 91 is provided extend from the wiring portion 11 of the base 1 over the portion of the through holes 14 for wire fastening in the first outer frame portion 18 to the outside of the first outer frame portion 18. Moreover, an intermediate portion of the wires 9 that leaves a predetermined length to the connector 91 at the end is fastened by the belt type fastener 8 with the holding device 7 to the portion of the through holes 14 for wire fastening in the first outer frame portion 18.

On the other hand, the connector-type fastener 92 with the holding device 7 that is attached to an end of the wires 9 is fastened to the portion of the through holes 14 for wire fastening in the first outer frame portion 18 of the base 1.

Moreover, in the wire fitting 10 of the wire harness 100, the number of through holes 14 for wire fastening formed lining up in rows in the first outer frame portion 18 is at least as large as the number of wire fasteners 92 and 8 attached to the wires 9.

In the example shown in FIGS. 2 and 3, a larger number of through holes 14 for wire fastening than wire fasteners 92 and 8 attached to the wires 9 are disposed linearly in the first outer frame portion 18 of the base 1. That is to say, in the example shown in FIGS. 2 and 3, some of the through holes 14 for wire fastening are unused.

Belt-Type Fastener

Figure 4:
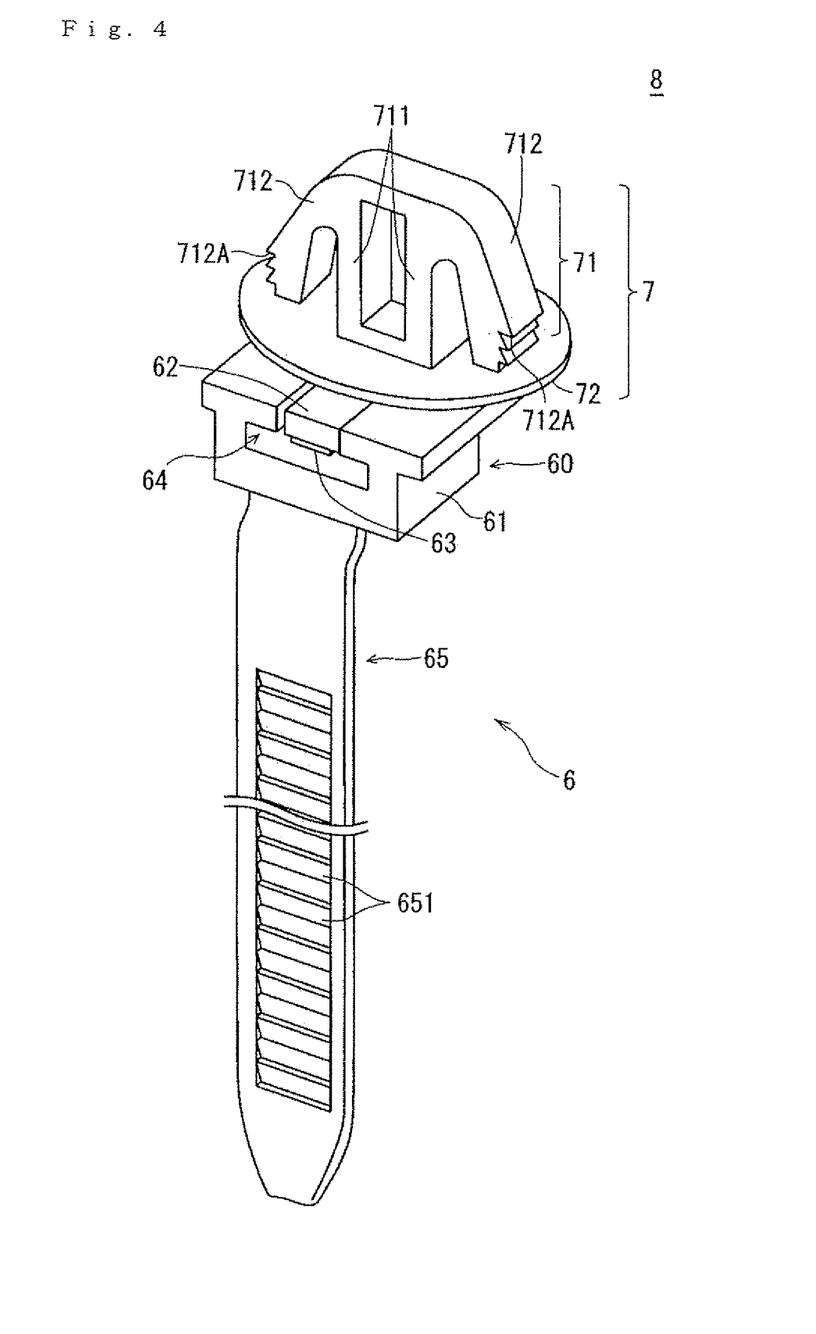
FIG. 4 is a perspective view of a holding device with a belt.

FIG. 4 is a perspective view of a belt-type fastener 8 with a holding device 7, which is an example of a wire fastener. The belt-type fastener 8 includes a holding device 7, a belt holding portion 60 and a belt 65. The belt-type fastener is molded in one piece of thermoplastic resin, such as polypropylene (PP) or polyamide (PA).

Belt

The belt 65 is a member that is wound around the wires 9. On one face of the belt 65, a plurality of depressions 651 are formed lining up in the longitudinal direction of the belt 65.

Holding Device

The holding device 7 is a portion that is fastened to a portion in which through holes are formed in a plate member, for example, the portion in the first outer frame portion 18 of the base 1 in which the through holes 14 for wire fastening are formed. The holding device 7 includes an insertion portion 71 that can be inserted into an attachment hole, which is a through hole of the plate member, and a flange portion 72 to which the belt holding portion 60 is fixed. The holding device 7 grips the edge of the attachment hole with the insertion portion 71 and the flange portion 72.

The belt holding portion 60 is fastened to one side of the flange portion 72, and the insertion portion 71 stands erect on the other side. The flange portion 72 is provided with a larger surface area than that of the attachment hole, so that it closes the attachment hole. For example, the flange portion 72 may have a similar shape as the through holes 14 for wire fastening, which are long holes, and may be dish-shaped with a surface that is slightly larger than the through holes 14 for wire fastening.

The insertion portion 71 includes a column portion 711 erected on one surface of the flange portion 72, and two outrigger portions 712 provided overhanging on both sides of the column portion 711. The two outrigger portions 712 are flexible, and are formed such that the width by which they overhang on both sides of the column portion 711 is larger than the width of the attachment holes (through holes 14 for wire fastening).

When the insertion portion 71 is inserted into an attachment hole, the two outrigger portions 712 contact the edge of the attachment hole and are pressed together, and the width by which they overhang on both sides of the column portion 711 is contracted to the width of the attachment hole. When the insertion portion 71 is pushed further into the attachment hole, the shape of the two outrigger portions 712 is restored on the rear side of the edge of the attachment hole to a width that is larger than the width of the attachment hole. As a result, pawls 712A formed on the outer side of each of the two outrigger portions 712 catch the rear side of the edge of the attachment hole, and the pawls 712A and the flange portion 72 sandwich the edge of the attachment hole from the front and the rear. As a result, the holding device 7 is fastened to the portion of the attachment hole of the plate member.

Belt Holding Portion

The belt holding portion 60 couples the belt 65 and the holding device 7. One end (fixed end) of the belt 65 is fixed to the belt holding portion 60. By catching a portion of the belt 65, this belt holding portion 60 holds the belt 65 in a ring shape wound around the wires 9.

More specifically, the belt holding portion 60 has a frame shape in which a belt passing hole 64 is formed, which is a through hole into which the free end of the belt 65 can be inserted. Moreover, a part of the belt holding portion 60 that forms a part of the wall surrounding the belt passing hole 64 constitutes a displacement portion 62 that is supported in a cantilever beam-like fashion. Due to its flexibility, this displacement portion 62 can be displaced in the height direction of the belt passing hole 64. The height direction of the belt passing hole 64 corresponds to the thickness direction of the belt 65 passed through the belt passing hole 64.

As shown in FIG. 4, a belt-restraining portion 63 engaging the depressions 651 in the belt 65 protrudes from the surface of the displacement portion 62 on the side of the belt passing hole 64. When the belt 65 is passed with its free end through the belt passing hole 64, the belt-restraining portion 63 is pressed by the elastic force of the displacement portion 62 towards the belt 65, and engages the depressions 651 in the belt 65. Thus, the belt-restraining portion 63 restrains the movement of the belt 65 in the direction in which the belt 65 comes out of the belt passing hole 64.

When movement of the belt 65 is restrained by the belt-restraining portion 63, the belt 65, which is wound around the wires 9, is held in a state in which it is in close contact with the outer circumferential surface of the wires 9. That is to say, the displacement portion 62 and the belt-restraining portion 63 have the function of holding the size of the ring of the belt 65 wound around the wires 9. That is to say, the surface of the belt passing hole 64 on the entrance side of the belt 65 is an oblique surface, so that the belt-restraining portion 63 allows easy removal of the belt 65 from the depressions 651 only when the belt 65 moves in the direction in which it is inserted into the belt passing hole 64.

The belt 65 of the belt-type fastener 8 is held in a state in which it is wound around an intermediate portion of the wires 9 to which a connector 91 without holding device 7 is attached, leaving a predetermined length to the connector 91 at the end. Moreover, the holding device 7 of the belt-type fastener 8 that is attached to the wires 9 is fastened to the portion of the through holes 14 for wire fastening in the first outer frame portion 18. For this, the insertion portion 71 of the holding device 7 in the belt-type fastener is inserted into one of the through holes 14 for wire fastening.

Connector-Type Fastener

Figure 5:
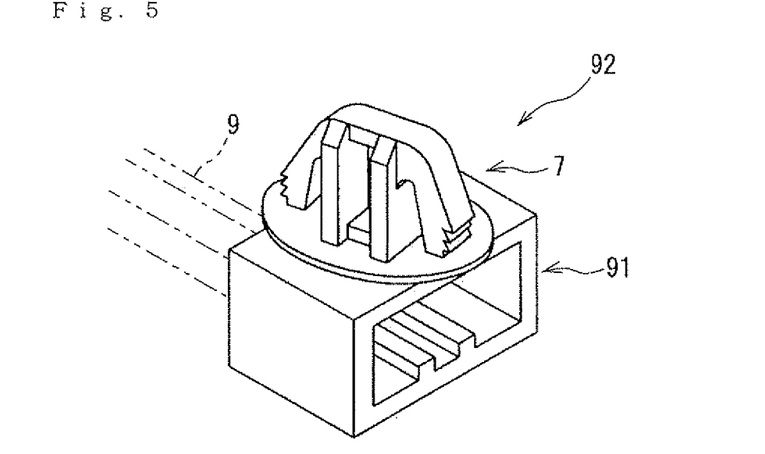
FIG. 5 is a perspective view of a connector with a holding device.

FIG. 5 is a perspective view of a connector-type fastener 92 with a holding device 7, which is an example of a wire fastener. The connector-type fastener 92 is made of a connector 91 that is attached to an end of the wires 9 and a holding device 7 that is coupled to or anchored to the connector 91. It should be noted that the holding device 7 of the connector-type faster 92 has the same structure as the holding device 7 of the belt-type fastener 8.

The connector-type fastener 92, which is attached to an end of the wires 9, is fastened to the portion of the through holes 14 for wire fastening of the first outer frame portion 18. For this, the insertion portion 71 of the holding device 7 of the connector-type fastner 92 is inserted into one of the through holes 14 for wire fastening.

Application Example of Holding Device

Figure 6:
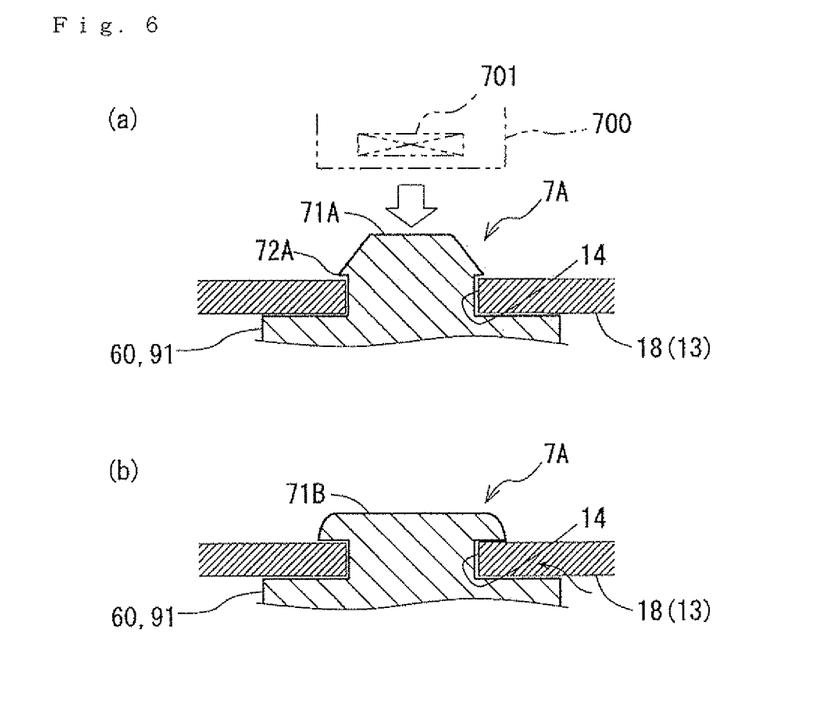
FIG. 6 is a cross-sectional view of a holding device according to an application example that can be applied to the wire harness 100.

FIG. 6 is a cross-sectional view of a holding device 7A according to an application example having a different structure than the holding device 7 shown in FIGS. 4 and 5. FIG. 6A is a cross-sectional view of the first outer frame portion 18 and the holding device 7A prior to being fastened to the first outer frame portion 18 of the wire fitting 10. FIG. 6B is a cross-sectional view of the first outer frame portion 18 and the holding device 7A after being fastened to the first outer frame portion 18 of the wire fitting 10.

As shown in FIG. 6A, the holding device 7A is a protruding portion formed protruding from a main body portion of the wire fastener. Furthermore, the holding device 7A includes pawls 72A that are formed projecting outward. The main body portion of the wire fastener is the belt holding portion 60 in the belt-type fastener 8 and is the connector 91 in the connector-type fastener 92.

The holding device 7A is inserted into one of the through holes 14 for wire fastening of the first outer frame portion 18. Thus, the pawls 72A catch the edge of the through hole 14 for wire fastening, and the holding device 7A is preliminarily fixed to the first outer frame portion 18.

Then, as shown in FIG. 6A, a heating device, such as a pressing device 700 incorporating a heater 701, is pressed against the top portion 71A of the holding device 7A inserted into the through hole 14 for wire fastening. Thus, the top portion 71A of the holding device 7A melts and is spread more thinly, so that its contour shape deforms to a top portion 71B that is larger than the through hole 14 for wire fastening. As a result, the enlarged top portion 71B of the holding device 7A forms a portion preventing the holding device 7A from coming off, and the holding device 7A is fastened to the portion of the through holes 14 for wire fastening in the first outer frame portion 18. It is also possible to employ a holding device 7A as shown in FIG. 6 in the wire harness 100.

In the wire harness 100, the base 1 and the cover 2 are assembled and fixed to each other in a state in which the mid portion of the plurality of wires 9 arranged on the wiring portion 11 is tucked between the wiring portion 11 and the opposing wall portion 21. In the present embodiment, the portions where the preliminary fixing recesses 16 and the preliminary fixing protrusions 26 are in contact with each other are welded by a spot-heating device, such as by ultrasound welding, fixing the cover 2 to the base 1. Thus, the cover 2 is assembled to the base 1 and is held in a state in which the mid portion of the plurality of wires 9 is tucked between the base 1 and the cover 2.

For example, when the preliminary fixing protrusions 26 are fitted into the preliminary fixing recesses 16, the bottom surfaces of the preliminary fixing recesses 16 may be in contact with the top surfaces of the preliminary fixing protrusions 26. In this case, welding portions are formed at the portions where the bottom surfaces of the preliminary fixing recesses 16 are in contact with the top surfaces of the preliminary fixing protrusions 26.

Effect

In the wire harness 100, the wires 9 are tucked between the cover 2 and the base 1 constituting the wire fitting 10, and are fastened at predetermined positions on the first outer frame portion 18 of the base 1 by wire fasteners 92 and 8 that are fastened to the portion of the through holes 14 for wire fastening in the base 1.

Consequently, those portions of the wires 9 attached to the wire fitting 10 that are fastened by the wire fasteners 92 and 8 are held at constant positions, and moreover, the length of the portion on the terminal end side from the portion that is fastened by the wire fasteners 92 and 8 is held at a constant length. That is to say, the shape of the wires 9 held by the wire fitting 10 is such that the ends of the wires reach their connection counterparts at just the right length. Moreover, the wires 9 are protected by the base 1 and the cover 2.

Moreover, in the wire harness 100, the portion of the wires 9 that is arranged on the wiring portion 11 of the base 1, that is, the mid portion up to the first outer frame portion 18 of the base 1 is accommodated inside the large wiring space 90 between the wiring portion 11 of the base 1 and the cover 2.

Consequently, in the operation of laying out the wires 9 on the wiring portion 11 of the base 1, the wires 9 can be laid out in arbitrary paths on the wiring portion 11, and even if the wires 9 are lifted up from the wiring portion 11, the wires 9 can be accommodated within the wiring space 90 between the wiring portion 11 of the base 1 and the cover 2 simply by pushing the cover 2 onto the base 1. That is to say, a bothersome operation of laying out the wires 9 while pushing the wires 9 lifted up from the wiring portion 11 of the base 1 into the wiring portion 11 is not necessary.

Moreover, the attachment of the wire fitting 10 to the wires 9 can be completed simply by assembling the cover 2 to the base 1 after fastening the wire fasteners 92 and 8 that are attached to the portions of the wires 9 that need to be fastened to the portion of the through holes 14 for wire fastening at the predetermined positions in the first outer frame portion 18 of the base 1. Consequently, by employing the wire fitting 10, the structure and the operation for holding the wires 9 in a predetermined shape as well as the structure and the operation for covering the portion of the wires 9 to be protected (intermediate portion) can be simplified.

Moreover, in the first outer frame portion 18 of the base 1, the first step portion 12A on the inner edge side and the first step portion 12B on the outer edge side function as reinforcements that increase the rigidity of the overall base 1, and in particular the rigidity of the first outer frame portion 18. Accordingly, the wire fasteners 92 and 8 in the wire harness 100 are fastened to the first outer frame portion 18 of the base 1 with high rigidity. For this reason, the wire fitting 10 of the wire harness 100 is superior in its performance (rigidity) of holding the wires 9 in a constant shape.

Furthermore, in the wire fitting 10, at least the same number of through holes 14 for wire fastening as there are wire fasteners 92 and 8 are formed lining up in rows in the first outer frame portion 18 of the base 1. Therefore, the fastening positions of the wire fasteners 92 and 8 constituting the wire harness 100 can be selected from a plurality of positions prepared in advance in accordance with the required specifications. Consequently, the wire fitting 10 is superior in its ability to be adapted to a variety of required specifications.

Moreover, in the wire fitting 10, the plurality of through holes 14 for wire fastening are lined up in rows along a range in the first outer frame portion 18 that encloses the entire perimeter of the wiring portion 11. Due to employing such a wire fitting 10, it is possible to fasten the wires 9 to positions that are extremely close to their connection counterparts, regardless of the direction in which the connection counterparts of the wires are located with respect to the perimeter of the wire fitting 10. As a result, the freedom to select the wire fastening positions is increased even more.

Moreover, the wire grooves 15 and 25 through which the wires 9 pass in the wire fitting 10 are formed in the first step portion 12A on the inner edge side of the base 1 and the second step portion 22 of the cover 2. Thus, the passage of the wires 9 that are laid out from the wiring portion 11 of the base 1 across the portion of the through holes 14 for wire fastening of the first outer frame portion 18 can be ensured, and the gap between the base 1 and the cover 2 outside this passage becomes narrow. Therefore, it can be prevented that the wires 9 arranged in the wiring space 90 on the wiring portion 11 of the base 1 stick out from the gap between the base 1 and the cover 2.

Moreover, in the wire harness 100, one or both of the connector-type fastener 92 and the belt-type fastener 8 are employed as a wire fastener. Such a wire harness 100 can accommodate both forms in which a connector at the end of the wires 9 is fastened on the wire fitting 10 and forms in which the connector at the end of the wires 9 is arranged outside of the wire fitting 10, and the freedom of selecting the form by which the wires 9 are held is high.

Generally, members obtained by vacuum-molding flat plate-shaped members can be manufactured more easily and at lower cost than members that are obtained by injection molding of resin. The wire fitting 10 is a member that can be obtained by vacuum-molding of flat plate-shaped members, so that the manufacturing time and manufacturing costs can be reduced.

Further Considerations

It is possible that the base 1 and the cover 2 of the wire fitting 10 are members that are obtained by injection molding of resin. However, the wire fitting 10 is a member that is molded into an uneven plate shape only in vertical direction (extending in a single dimension), and is a member that can be obtained easily by vacuum molding a plate-shaped resin member. Consequently, in view of the manufacturing time and manufacturing costs, it is desirable that the wire fitting 10 is a member that can be obtained by vacuum molding a flat plate-shaped member.

The base 1 and the cover 2 of the wire fitting 10 may be separate members, but it is also possible that the base 1 and the cover 2 are configured to be connected via a connection portion that can be elastically bent and deformed.

It is also possible that the cover 2 of the wire fitting 10 is a member having a flat plate shape. However, in this case, it is preferable that the projection portions serving as spacers for holding the gap between the base 1 and the cover 2 are formed on the side of the base 1.

Moreover, it is possible that the area over which the plurality of through holes 14 for wire fastening are formed in the first outer frame portion 18 of the wire fitting 10 extends only partially around the entire perimeter of the wiring portion 11. For example, if the base 1 and the cover 2 are configured to be connected via a connection portion that can be elastically bent and deformed, then the area in which the plurality of through holes 14 for wire fastening are formed may be the part of the overall perimeter of the wiring portion 11 excluding that part where the connection portion is formed.

What is claimed is:

1. A wire harness comprising:
a wire;
a wire fitting including an uneven plate-shaped base defining a wiring space accommodating a part of the wire, and a plate-shaped cover that is assembled to the base and covers the wiring space; and
one or more wire fasteners attached to the wire and fastened to a portion of the wire fitting where through holes for wire fastening are formed;
wherein the base of the wire fitting comprises:
a bottom plate portion facing the wiring space; and
an outer frame portion formed projecting around the wiring space, the outer frame portion including an inner edge step portion rising from the bottom plate portion along an outer edge of the bottom plate portion, an intermediate plate portion projecting outward from the inner edge step portion, a plurality of the through holes for wire fastening being disposed linearly along the intermediate plate portion, the number of the through holes for wire fastening being at least the number of the wire fasteners attached to a portion of the wire that extends from the bottom plate portion to the outside thereof, and an outer edge step portion extending along an outer edge of the intermediate plate portion.

2. The wire harness according to claim 1, wherein, in the base of the wire fitting, the plurality of through holes for wire fastening is disposed linearly along the outer frame portion around the entire perimeter of the bottom plate portion.

3. The wire harness according to claim 1, wherein a plurality of groove-shaped portions defining pathways for the wire are disposed in the inner edge step portion of the outer frame portion of the base of the wire fitting, the pathways each extending from the bottom plate portion to a respective one of the through holes for wire fastening.

4. The wire harness according to claim 1, wherein the wire fastener comprises:
a connector attached to an end of the wire; and
a holding device protruding from the connector, the holding device being fastened to that portion of the outer frame portion of the base where the through holes for wire fastening are disposed.

5. The wire harness according to claim 1, wherein the wire harness comprises:
a belt wound around the wire;
a belt holding portion holding the belt in ring shape; and
a holding device protruding from the belt holding portion, the holding device being fastened to that portion of the outer frame portion of the base where the through holes for wire fastening are disposed.

6. The wire harness according to claim 1,
the base and the cover of the wire fitting being members being formed by vacuum-molding flat plate-shaped resin members.

7. The wire harness of claim 1,
wherein the base and the cover have corresponding protrusions and recesses for assembling the cover and the base together.

8. The wire harness of claim 7, wherein the corresponding protrusions and recesses of the cover and base are welded together.

9. The wire harness of claim 1,
wherein the base and the cover are connected by a connection portion that may be elastically bent and deformed.

10. The wire harness of claim 4,
wherein the holding device has a top portion opposite the connector, the holding device being disposed extending through a first through hole of the through holes for wire fastening, and the top portion being larger than the through hole.

11. The wire harness of claim 5,
wherein the holding device has a top portion opposite the belt holding portion, the holding device being disposed extending through a first through hole of the through holes for wire fastening, and the top portion being larger than the through hole.

12. A wire fitting comprising:
an uneven plate-shaped base forming a wiring space accommodating a part of a wire; and
a plate-shaped cover that is assembled to the base and covers the wiring space; and
wherein the base comprises:
a bottom plate portion facing the wiring space; and
an outer frame portion projecting around the wiring space, the outer frame portion including an inner edge step portion rising from the bottom plate portion along an outer edge of the bottom plate portion, an intermediate plate portion projecting outward from the inner edge step portion, a plurality of the through holes for wire fastening disposed linearly along the intermediate plate portion, such that a portion of a wire fastener can be inserted through the through holes for wire fastening, and an outer edge step portion extending along an outer edge of the intermediate plate portion.

* * * * *